United States Patent Office 3,020,278
Patented Feb. 6, 1962

3,020,278
VITAMIN-OROTIC ACID COMPOSITIONS
Edgar A. Ferguson, Jr., 150 Woodruff Ave.,
Brooklyn, N.Y.
No Drawing. Filed Sept. 16, 1959, Ser. No. 840,259
4 Claims. (Cl. 260—256.6)

The present invention relates to orotic acid derivatives of certain vitamins, namely thiamine (either thiamine chloride or thiamine mononitrate—giving different results in each case) and choline.

The compounds of the present invention are effective appetite stimulants.

In accordance with the present invention various compounds are formed depending upon the reactants used and also on the mol ratios of reactants.

The reaction of thiamine chloride and orotic acid (in the form of the silver salt thereof) will result in the formation of thiamine orotate where the mol ratio of reactants is 1:1, and in thiamine orotate orotic acid where the mol ratio of reactants is 1:2.

The reaction of thiamine mononitrate with orotic acid results in the formation of the addition salt-thiamine mononitrate orotic acid.

The reaction between choline and orotic acid results in the formation of choline orotate.

The following examples are meant to illustrate some of the methods of manufacture. These examples are not presented for any purpose of limiting the scope and spirit of the invention as revealed in the specifications and appended claims. Other methods will be apparent to one skilled in the art.

Example 1

Take 26 grams of the silver salt of orotic acid in 260 ml. of water. Add 30 grams of thiamine chloride dissolved in 30 cc. of water (complete solution is now necessary). The precipitate is separated and discarded. The solution of thiamine orotate is utilized either as a solution or concentrated and dried.

Example 2

Take 52 grams of the silver salt of orotic acid in 260 ml. of water. Add 34 grams of thiamine chloride hydrochloride in 34 ml. of water (complete solution may be obtained at 20° C.). The precipitate is separated. The filtrate is used as a solution for after concentration and drying to a powder of thiamine orotate.

Example 3

Take 33 grams of thiamine mononitrate in 110 ml. of water at 100° C. This should be boiled under reflux conditions to maintain constant volume. While boiling under reflux conditions add 16 grams of orotic acid. Allow the mixture to continue to boil for 10 minutes. Allow to cool to room temperature. The solution may be used as thiamine mononitrate orotic acid or the water may be removed and the residue dried.

Example 4

Dissolve 16 grams of orotic acid in 32 ml. of water at room temperature. Add, in a dry air chamber 12 grams of choline. The container is kept closed for 15 minutes after which the solution may be used as a solution of choline orotate or may be dried to a powder and the residue utilized.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range or the equivalence of the following claims.

What is claimed as new and desired to be secured by Letters Patent is:

1. A compound selected from the group consisting of thiamine orotate, thiamine orotate orotic acid, and thiamine mononitrate orotic acid.
2. Thiamine orotate.
3. Thiamine mononitrate orotic acid.
4. Thiamine orotate orotic acid.

References Cited in the file of this patent

UNITED STATES PATENTS 2,209,244    Andersag et al.  ---------- July 23, 1940